United States Patent
Upp et al.

(10) Patent No.: US 9,516,620 B1
(45) Date of Patent: Dec. 6, 2016

(54) METHOD AND APPARATUS FOR BINDING OF A USER-BASED PUBLIC IDENTITY TO A SHARED DEVICE IN AN INTERNET PROTOCOL MULTIMEDIA SUBSYSTEM (IMS)-BASED COMMUNICATION SYSTEM

(71) Applicant: MOTOROLA SOLUTIONS, INC., Schaumburg, IL (US)

(72) Inventors: Steven D. Upp, Bartlett, IL (US); Karen M. Upp, Bartlett, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/980,585

(22) Filed: Dec. 28, 2015

(51) Int. Cl.
*H04W 4/00* (2009.01)
*H04W 60/04* (2009.01)
*H04W 8/18* (2009.01)
*H04L 29/06* (2006.01)
*H04W 60/06* (2009.01)

(52) U.S. Cl.
CPC .......... *H04W 60/04* (2013.01); *H04L 65/1016* (2013.01); *H04L 65/1073* (2013.01); *H04W 8/183* (2013.01); *H04W 60/06* (2013.01)

(58) Field of Classification Search
CPC ....... H04W 4/02; H04W 8/18; H04W 12/08; H04W 76/02; G06Q 10/10; H04L 65/1016; H04L 65/1073; H04L 67/306; H04L 29/12188; H04L 61/1588; H04L 61/3095
USPC .......... 455/435.1, 411, 435.2; 370/401, 328, 370/352; 709/222
See application file for complete search history.

(56) References Cited

U.S. PATENT DOCUMENTS

| | | | |
|---|---|---|---|
| 8,634,828 B2 * | 1/2014 | Shi | H04W 4/003 455/432.3 |
| 8,874,081 B2 | 10/2014 | Horn et al. | |
| 9,071,623 B2 * | 6/2015 | Arthursson | G06F 9/45504 |
| 2004/0236748 A1 * | 11/2004 | Coltrera | G06F 17/30893 |
| 2010/0311444 A1 * | 12/2010 | Shi | H04W 4/003 455/466 |
| 2011/0075658 A1 * | 3/2011 | Belinchon Vergara | H04L 29/12188 370/352 |
| 2011/0078129 A1 * | 3/2011 | Chunilal | G06F 17/30867 707/706 |
| 2013/0079059 A1 * | 3/2013 | Huslak | G06Q 10/10 455/558 |
| 2013/0251149 A1 * | 9/2013 | Xu | H04W 12/04 380/270 |
| 2014/0128024 A1 * | 5/2014 | Horn | H04W 8/20 455/406 |
| 2016/0242019 A1 * | 8/2016 | Vanderveen | H04W 8/005 |

* cited by examiner

*Primary Examiner* — Mahendra Patel (57) ABSTRACT

Methods and apparatuses bind a user's IMS public identity to, and unbind it from, a mobile device (MD) shared among multiple users. In binding the user's IMS public identity, a message is received from the MD, which message comprises a shared service authorization access token that is associated with a shared service and that comprises an identifier of a user of the MD. The message further comprises a default public identity of the MD. Based on the user identifier and the default public identity, the user is determined to be authorized to use the MD for the shared service. In response to the determination, a public identity of the user is obtained and mapped to the MD to bind a private identity and a public identity of the MD and the public identity of the user, and a user subscription database is instructed to update the user's service subscription information.

28 Claims, 8 Drawing Sheets

METHOD AND APPARATUS FOR BINDING OF A USER-BASED PUBLIC IDENTITY TO A SHARED DEVICE IN AN INTERNET PROTOCOL MULTIMEDIA SUBSYSTEM (IMS)-BASED COMMUNICATION SYSTEM

FIELD OF THE INVENTION

The present invention relates generally to wireless communication systems and, in particular, to dynamically binding a user-based public identity to a mobile device shared among multiple users in an Internet Protocol Multimedia Subsystem (IMS)-based communication system.

BACKGROUND OF THE INVENTION

In mobile telecommunications, a subscriber is often identified by a Mobile Subscriber Integrated Services Digital Network-Number (MSISDN) and an International Mobile Subscriber Identity (IMSI). The MSISDN is used to route calls to a user equipment (UE) of the subscriber. The IMSI identifies a subscriber to a telecommunications network and typically is permanently associated with a Universal Integrated Circuit Card (UICC), such as a Subscriber Identity Module (SIM) or Universal Subscriber Identity Module (USIM), that is inserted into the UE. With the introduction of IMS, the UICC has been extended to include another security profile called the ISIM (IMS Subscriber Identity Module (ISIM). The MSISDN typically is bound to the IMSI by a service provider when the subscription is purchased for service from a cellular service provider.

Many modern telecommunication systems are moving toward using an Internet Protocol Multimedia Subsystem (IMS), which is an architectural framework for delivering multimedia services over Internet Protocol (IP). IMS aims to provide all mobile telecommunications over IP. For example, applications such as Voice over Long Term Evolution (VoLTE), Video over Long Term Evolution (ViLTE), Short Message Service (SMS), Multimedia Messaging Service (MMS), Mission Critical Push To Talk (MCPTT), and Rich Communication Systems (RCS) all rely on IMS.

A subscription on IMS is identified by an IP multimedia private identity (IMPI) and can have one or more IP multimedia public identities (IMPU) where the IMPUs are typically a URI of several different forms including a SIP URI and a TEL URI. The IMPI and the associated authentication key material is typically stored on a UICC within a profile called an IP Multimedia Services Identity Module (ISIM). During IMS registration, the UE sends the IMPI and a default IMPU to a registrar that queries a Home Subscriber Server (HSS) such that the HSS can generate authentication challenge information and subsequently verify the authenticity of the device through an authentication exchange with the UE's ISIM. Once the authentication has been completed, the HSS typically retrieves the set of IMPUs from the HSS database and informs the UE of these identities. The IMS system then records the relevant routing information so that subsequent service requests to the public identities of the newly registered UE are delivered to the client.

One limitation of the above configuration is that in some applications that rely on IMS, the UE is shared among multiple users. Therefore, the public identities to reach a human user are associated with an IMS device and not associated with the human user of the device. For example, in a public safety network, such as First Responder Network (FirstNet), a UE can be shared between multiple users from an agency across different work shifts. However, it is desirable that a specific user be reachable via a consistent public identity such as a phone number regardless of which UE they are in possession of.

BRIEF DESCRIPTION OF SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

A method and apparatus are provided that bind a user's Internet Protocol Multimedia Subsystem (IMS) public identity to a mobile device that is shared among multiple users. A message is received from the mobile device, which message comprises a shared service authorization access token that is associated with a shared service, wherein the shared service authorization access token comprises an identifier of a user of the mobile device, and wherein the message further comprises a default public identity of the mobile device. Based on the identifier of the user and the default public identity of the mobile device, it is determined that the user is authorized to use the mobile device for the shared service. In response to determining that the user is authorized to use the mobile device for the shared service, a public identity of the user is obtained, the public identity of the user is mapped to the mobile device to bind a private identity and a public identity of the mobile device and the public identity of the user, and a user subscription database is instructed to update the user's service subscription information. A method and apparatus also are provided for unbinding the user's IMS public identity from the mobile device.

Generally, an embodiment of the present invention encompasses a method for binding a user's Internet Protocol Multimedia Subsystem (IMS) public identity to a mobile device that is shared among multiple users. The method includes receiving, by an infrastructure element from a mobile device, a message comprising a shared service authorization access token that is associated with a shared service, wherein the shared service authorization access token comprises an identifier of a user of the mobile device and wherein the message further comprises a default public identity of the mobile device, and based on the identifier of the user and the default public identity of the mobile device, determining that the user is authorized to use the mobile device for the shared service. The method further includes, in response to determining that the user is authorized to use the mobile device for the shared service, obtaining a public identity of the user, mapping the public identity of the user to the mobile device to bind a private identity and a public identity of the mobile device and public identity of the user, and instructing a user subscription database to update the user's service subscription information.

Another embodiment of the present invention encompasses a method for unbinding a user's IMS public identity from a mobile device that is shared among multiple users. The method includes determining, by an infrastructure device, that a log off event has occurred at the mobile device, wherein a public identity of a user is associated with a mobile device identifier of the mobile device. The method further includes, in response to determining that the log off event has occurred, updating the user's subscription information in a user subscription database, wherein updating comprises unbinding the public identity of the mobile device and the private identity of the mobile device from the public identifier of the user, and instructing the mobile device to remove the public identity of the user from the mobile device.

Yet another embodiment of the present invention encompasses an apparatus that is capable of binding a user's Internet Protocol Multimedia Subsystem (IMS) public identity to a mobile device that is shared among a plurality of users. The apparatus includes a shared device provisioning server comprising a processor and an at least one memory device. The at least one memory device is configured to store a set of instructions that, when executed by the processor, cause the processor to perform the following functions: receive, from a mobile device, a message comprising a shared service authorization access token that is associated with a shared service, wherein the shared service authorization access token comprises an identifier of a user of the mobile device and wherein the message further comprises a default public identity of the mobile device; based on the identifier of the user and the default public identity of the mobile device, determine that the user is authorized to use the mobile device for the shared service; in response to determining that the user is authorized to use the mobile device for the shared service, obtain a public identity of the user; map the public identity of the user to the mobile device to bind a private identity and a public identity of the mobile device and public identity of the user; and instruct a user subscription database to update the user's service subscription information.

Figure 1:
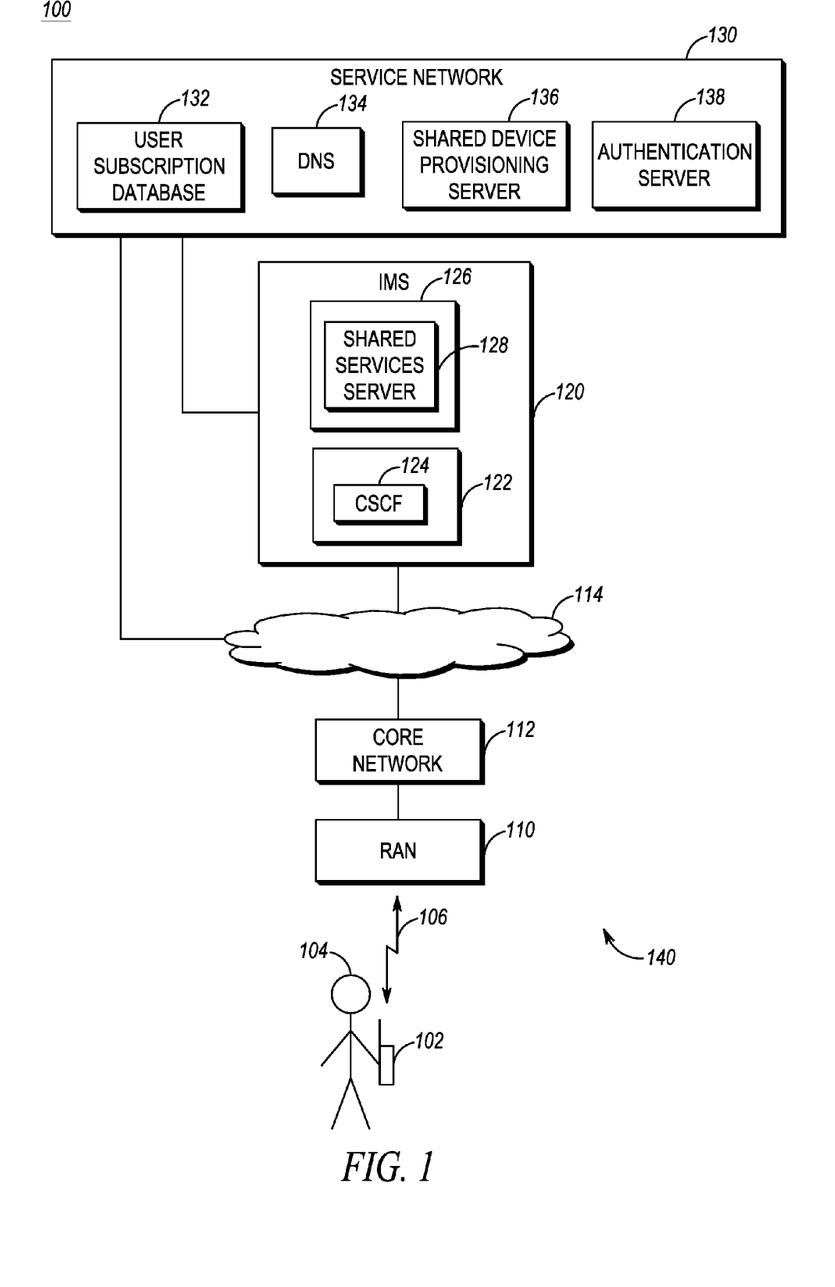
FIG. 1 is a block diagram of an Internet Protocol Multimedia Subsystem (IMS)-based wireless communication system in accordance with various embodiments of the present invention.

The present invention may be more fully described with reference to FIGS. 1-6B. FIG. 1 is a block diagram of a wireless communication system 100 in accordance with some embodiments of the present invention. Communication system 100 includes a mobile device 102, for example but not limited to a cellular telephone, a smartphone, a Land Mobile Radio (LMR) with LTE (Long-Term Evolution) capability (also known as a converged device), or a Personal Digital Assistant (PDA), personal computer (PC), or laptop computer equipped for wireless voice and data communications. In various radio technologies, a mobile device such as mobile device 102 may be referred to as a user equipment (UE), a subscriber station (SS), an access terminal (AT), a mobile station (MS), or the like.

Communication system 100 further includes a Radio Access Network (RAN) 110, such as an evolved Universal Terrestrial Radio Access Network (E-UTRAN), that provides wireless communication services to mobile devices, such as mobile device 102, located in a coverage area of the RAN via an air interface 106. Air interface 106 includes a forward link that includes a pilot channel, at least one forward link traffic channel, and forward link common and dedicated signaling channels, and a reverse link that includes at least one reverse link traffic channel, reverse link common and dedicated signaling channels, and an access channel.

RAN 110 includes a transceiver (not shown), such as a Base Station Transceiver (BTS), an Access Point (AP), or a Node B, and further may include a controller (not shown), such as a Base Station Controller (BSC) or a Radio Network Controller (RNC). RAN 110 is coupled to an Internet Protocol (IP)-based data network 114 via a core network 112, such as an Evolved Packet Core (EPC) that may include a Mobility Management Entity (MME), multiple gateways, such as a Serving Gateway and a Public Data Network Gateway (PDN GW), and a Policy Control and Charging Rules Function (PCRF).

Communication system 100 further includes an Internet Protocol Multimedia Subsystem (IMS) 120 that is coupled to data network 114 via one or more gateways (not shown), such as an IMS Gateway, a media server, and a media gateway. IMS 120 comprises an IMS core network layer 122 and an application layer 126. IMS core network layer 122 includes a Call Session Control Function (CSCF) 124. As is known in the art, the CSCF implements one or more of a Proxy CSCF (P-CSCF), a Serving CSCF (S-CSCF), and an Interrogating CSCF (I-CSCF). The CSCF serves as a centralized routing engine, policy manager, and policy enforcement point to facilitate the delivery of multiple real-time applications using IP transport. It is application-aware and uses dynamic session information to manage network resources (feature servers, media gateways, and edge devices) and to provide advance allocation of these resources depending on the application and user context. The I-CSCF is the contact point within an operator's network for all connections destined for a user of that network, or for a roaming user currently located within that network's service area. The S-CSCF is responsible for identifying the user's service privileges, selecting access to an application server coupled to the IMS network, and providing access to those servers. The P-CSCF is the SIP signaling contact point in the IMS core network for a mobile device, such as mobile device 102. The P-CSCF is responsible for forwarding Session Initiation Protocol (SIP) registration messages from a subscriber's endpoint, that is, for forwarding call set-up requests and responses to the S-CSCF. P-CSCF maintains a mapping between a logical subscriber SIP Uniform Resource Identifier (URI) address and an MS IP (Internet Protocol) address and a security association for both authentication and confidentiality. Application layer 126 includes one or more shared services servers 128 (one shown), that is, servers that provide an IMS Application Service that is simultaneously shared among multiple mobile devices (that is, a shared service), such as a Multimedia Telephony Application Server (MMTEL), that are in communication with IMS core network layer 122.

Communication system 100 further includes a home agency or enterprise service network 130 that is in communication with IMS 120 and further is accessible by mobile device 102 via RAN 110, core network 112, and data network 114. Service network 130 includes a user subscription database 132, such as a Home Subscriber Server (HSS), that maintains subscription information for all subscribers (such as user 104) in communication system 100, a Domain Name Server (DNS) 134, and multiple application functions (AFs), such as a Shared Device Provisioning Server 136 and an Authentication Server 138. The Shared Device Provisioning Server 136, for example, a modified version of an Identity Management Server (IdM), manages identities, authentication, authorization, roles, and privileges of subscribers, that is, users within communication system 100, and provisions user subscription database 132 with EMS subscriber information so the subscriber can utilize shared services. While user subscription database 132 and DNS 134 are depicted as part of service network 130, in other embodiments of the present invention, user subscription database 132 may be included in IMS 120 and be accessible by the elements (134, 136, 138) of service network 130, or one or more of user subscription database 132 and DNS 134 may be an element separate from each of service network 130 and IMS 120 and be accessible by the elements of each of IMS 120 (that is, CSCF 124 and shared services server 128) and service network 130 (that is, elements 132, 134, 136, and 138). Further, in some embodiments of the present invention, in addition to shared services provided by the one or more shared services servers 128, shared services sought to be accessed by mobile device 102 may be built into user subscription database 132 or may reside in an application server that is external to both IMS 120 and user subscription database 132.

RAN 110, core network 112, data network 114, IMS 120, and service network 130 collectively comprise an infrastructure 140 of communication system 100 and, correspondingly, the elements of each may be referred to as an infrastructure element of communication system 100. Similarly, components of IMS 120, such as CSCF 124 and shared services servers 128, each may be referred to as an IMS element.

Figure 2:
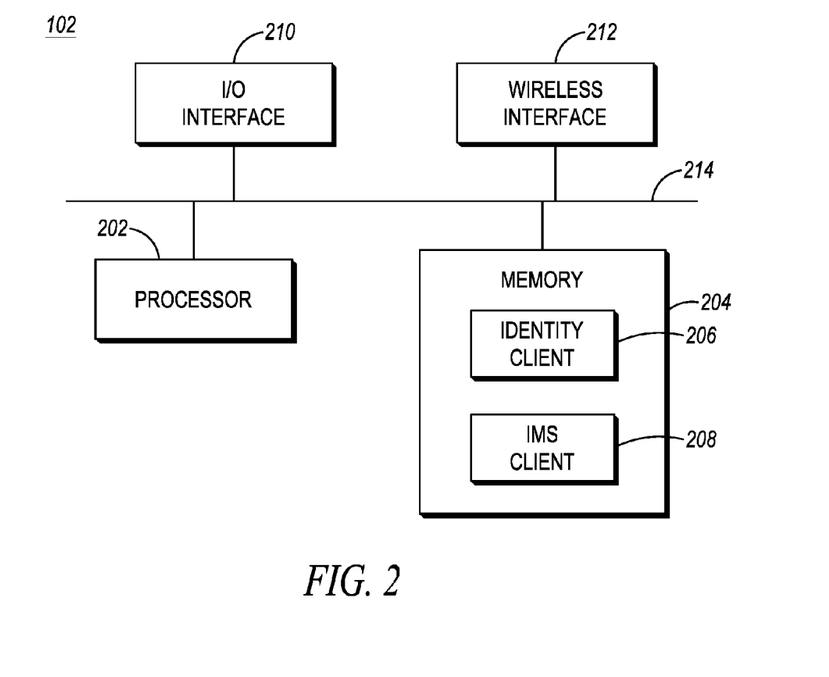
FIG. 2 is a block diagram of a mobile device of the wireless communication system of FIG. 1 in accordance with various embodiments of the present invention.

Referring now to FIG. 2, a block diagram of mobile device 102 is provided in accordance with some embodiments of the present invention. Mobile device 102 generally includes a processor 202, at least one memory device 204, one or more input/output (I/O) interfaces 210, and a wireless interface 212. It should be appreciated by those of ordinary skill in the art that FIG. 2 depicts mobile device 102 in an oversimplified manner, and a practical embodiment may include additional components and suitably configured processing logic to support known or conventional operating features that are not described in detail herein. The components (202, 204, 210, and 212,) of mobile device 102 are communicatively coupled via a local interface 214. Local interface 214 can be, for example but not limited to, one or more buses or other wired or wireless connections, as is known in the art. Local interface 214 can have additional elements, which are omitted for simplicity, such as controllers, buffers (caches), drivers, repeaters, and receivers, among many others, to enable communications. Further, local interface 214 may include address, control, and/or data connections to enable appropriate communications among the aforementioned components.

Mobile device 102 operates under the control of processor 202, such as one or more microprocessors, microcontrollers, digital signal processors (DSPs), combinations thereof or such other devices known to those having ordinary skill in the art. Processor 202 operates the corresponding mobile device according to data and instructions stored in the at least one memory device 204, such as random access memory (RAM), dynamic random access memory (DRAM), and/or read only memory (ROM) or equivalents thereof, that stores data and instructions that may be executed by the corresponding processor so that the mobile device may perform the functions described herein.

The one or more I/O interfaces 210 may include user interfaces that allow a user to input information in, and receive information from, mobile device 102. For example, the user interfaces may include a keypad, a touch screen, a scroll ball, a scroll bar, buttons, bar code scanner, and the like. Further, the user interfaces may include a display device such as a liquid crystal display (LCD), touch screen, and the like for displaying system output. I/O interfaces 210 also can include, for example, a serial port, a parallel port, a small computer system interface (SCSI), an infrared (IR) interface, a universal serial bus (USB) interface, and the like for communicating with, or coupling to, an external device. Wireless interface 212 includes a transceiver for facilitating an exchange of wireless communications with RAN 110.

The data and instructions maintained by at least one memory device 204 include software programs that include an ordered listing of executable instructions for implementing logical functions. For example, the software in at least one memory device 204 includes a suitable operating system (O/S) and programs. The operating system essentially controls the execution of other computer programs, and provides scheduling, input-output control, file and data management, memory management, and communication control and related services. The programs may include various applications, add-ons, etc. configured to provide user functionality with mobile device 102; for example, at least one memory device 204 maintains an identity client 206 that, when executed by processor 202, facilitates a peer-to-peer exchange of signaling with Shared Device Provisioning Server 136, and an IMS client 208 that, when executed by processor 202, facilitates a peer-to-peer exchange of signaling and traffic with IMS application servers, such as shared services server 128. At least one memory device 204 further maintains at least one default public identity for the mobile device, such as a subscriber unit identifier (SUID), an International Mobile Station Equipment Identity (IMEI), or an International Mobile Subscriber Identity (IMSI), that uniquely identifies the mobile device in communication system 100. Further, the at least one memory device 204 comprises a Universal Integrated Circuit Card (UICC) that stores Universal Subscriber Identity Module (USIM) and IMS Subscriber Identity Module (ISIM) credentials.

Figure 3:
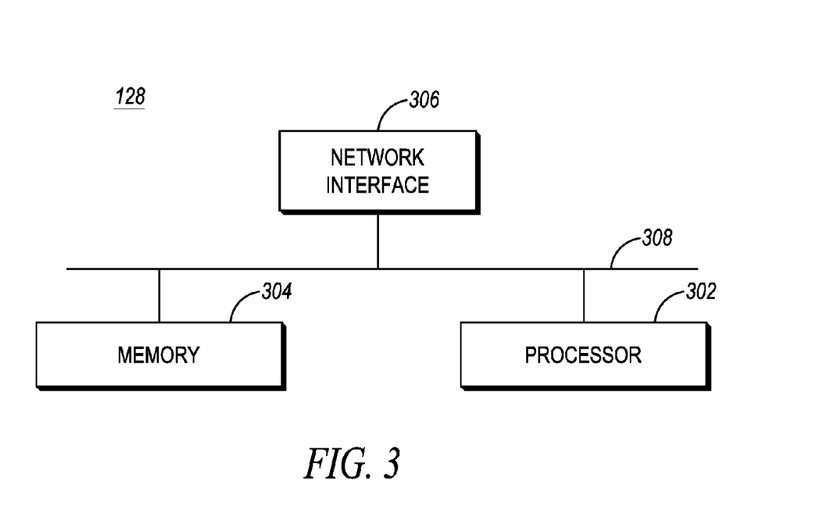
FIG. 3 is a block diagram of a shared services server of the wireless communication system of FIG. 1 in accordance with some embodiments of the present invention.
Figure 4:
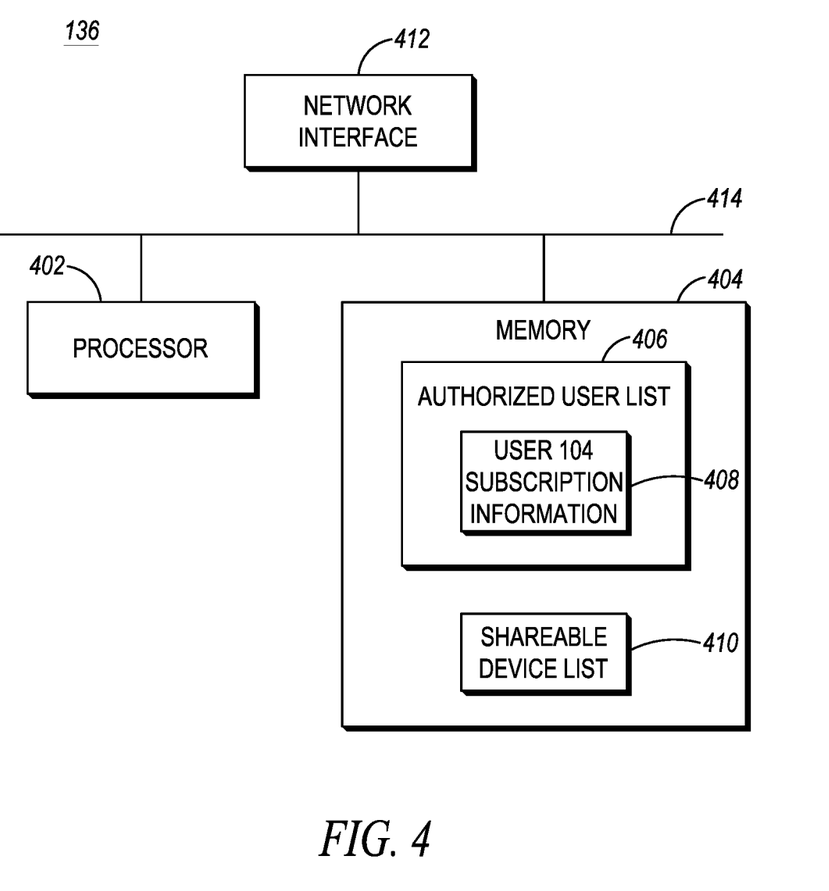
FIG. 4 is a block diagram of a Shared Device Provisioning Server of the wireless communication system of FIG. 1 in accordance with some embodiments of the present invention.

Referring now to FIGS. 3 and 4, block diagrams are provided of shared services server 128 and Shared Device Provisioning Server 136 in accordance with some embodiments of the present invention. Each of shared services server 128 and Shared Device Provisioning Server 136 includes a respective processor 302, 402, such as one or more microprocessors, microcontrollers, digital signal processors (DSPs), combinations thereof or such other devices known to those having ordinary skill in the art. Each of shared services server 128 and Shared Device Provisioning Server 136 further includes a respective at least one memory device 304, 404, such as random access memory (RAM), dynamic random access memory (DRAM), and/or read only memory (ROM) or equivalents thereof, that is in communication with a corresponding processor 302, 402, via a corresponding local interface 308, 414. Each of at least one memory devices 304, 404 stores data and programs, such as group call programs, that may be executed by the corresponding processor 302, 402 and that allows shared services server 128 and Shared Device Provisioning Server 136 to perform all functions necessary to operate in communication system 100.

At least one memory device 404 of Shared Device Provisioning Server 136 further maintains an authorized user list 406, that is, a list of users, or subscribers, such as user 104, that are authorized to use a shared device and that includes subscription information for each such user, such as user 104 subscription information 408. The subscription information may be maintained in association with a private identity, such as an IP multimedia private identity (IMPI), that is used to uniquely and permanently identify and authenticate the IMS service authorization information in the communication system 100. In addition, a set of one or more public identities, such as an IP multimedia public identity (IMPU), for example, an alphanumeric identifier such as SIP URI (Session Initiation Protocol Uniform Resource Identifier) (for example, sip:bob@domain.com) or a digital identifier such as a TEL URI (for example, tel:+18887654321), is maintained in association with the private identity and is used to publicly identify the user in communication system 100 and to route communications to and from the user in communication system 100. At least one memory device 404 of Shared Device Provisioning Server 136 also maintains a shareable device list 410, that is, a list of identifiers of mobile devices, such as mobile device 102, that are shareable devices, that is, that may be used by each of multiple different users, such as user 104. Further, for each mobile device included in shareable device list 410, the mobile device identifier is maintained in association with a private identity and a public identity of the mobile device. Authorized user list 406, shareable device list 410, and the private and public identities may be pre-provisioned into Shared Device Provisioning Server 136 by an operator of services network 130.

Each of shared services server 128 and Shared Device Provisioning Server 136 further includes a respective one or more network interfaces 306, 412 (one shown) that is in communication with the corresponding processor 302, 402 via the respective local interface 308, 414 and that provides for interfacing with other infrastructure elements of communication system 100. Each local interface 308, 414 can be, for example but not limited to, one or more buses or other wired or wireless connections, as is known in the art. Each local interface 308, 414 can have additional elements, which are omitted for simplicity, such as controllers, buffers (caches), drivers, repeaters, and receivers, among many others, to enable communications. Further, each local interface 308, 414 may include address, control, and/or data connections to enable appropriate communications among the aforementioned components of shared services server 128 and Shared Device Provisioning Server 136.

The functionality described herein as being performed by mobile device 102, shared services server 128, and Shared Device Provisioning Server 136 is implemented with or in software programs and instructions stored in the respective at least one memory device 204, 304, 404 of the mobile device, shared services server, and Shared Device Provisioning Server and executed by the processor 202, 302, 402 of the mobile device, shared services server, and Shared Device Provisioning Server. One of ordinary skill in the art realizes, however, that the embodiments of the present invention alternatively may be implemented in hardware, for example, integrated circuits (ICs), application specific integrated circuits (ASICs), and the like, such as ASICs implemented in one or more of the mobile device, shared services server, and Shared Device Provisioning Server. Based on the present disclosure, one skilled in the art will be readily capable of producing and implementing such software and/or hardware without undue experimentation.

Preferably, communication system 100 is a 3GPP (Third Generation Partnership Project) LTE (Long Term Evolution) communication system that provides packet data communication services to subscribers serviced by the network; however, other applicable packet data systems include, but are not limited to, 3GPP2 UMB and WiMAX packet data systems and any one of a variety of wireless packet data communication systems that support multimedia packet data-based communication sessions. To ensure compatibility, radio system parameters and call processing procedures are specified by the standards, including call processing steps that are executed by an MS and a RAN or other access network serving the MS and between the RAN or other access network and associated infrastructure.

Figure 5A:
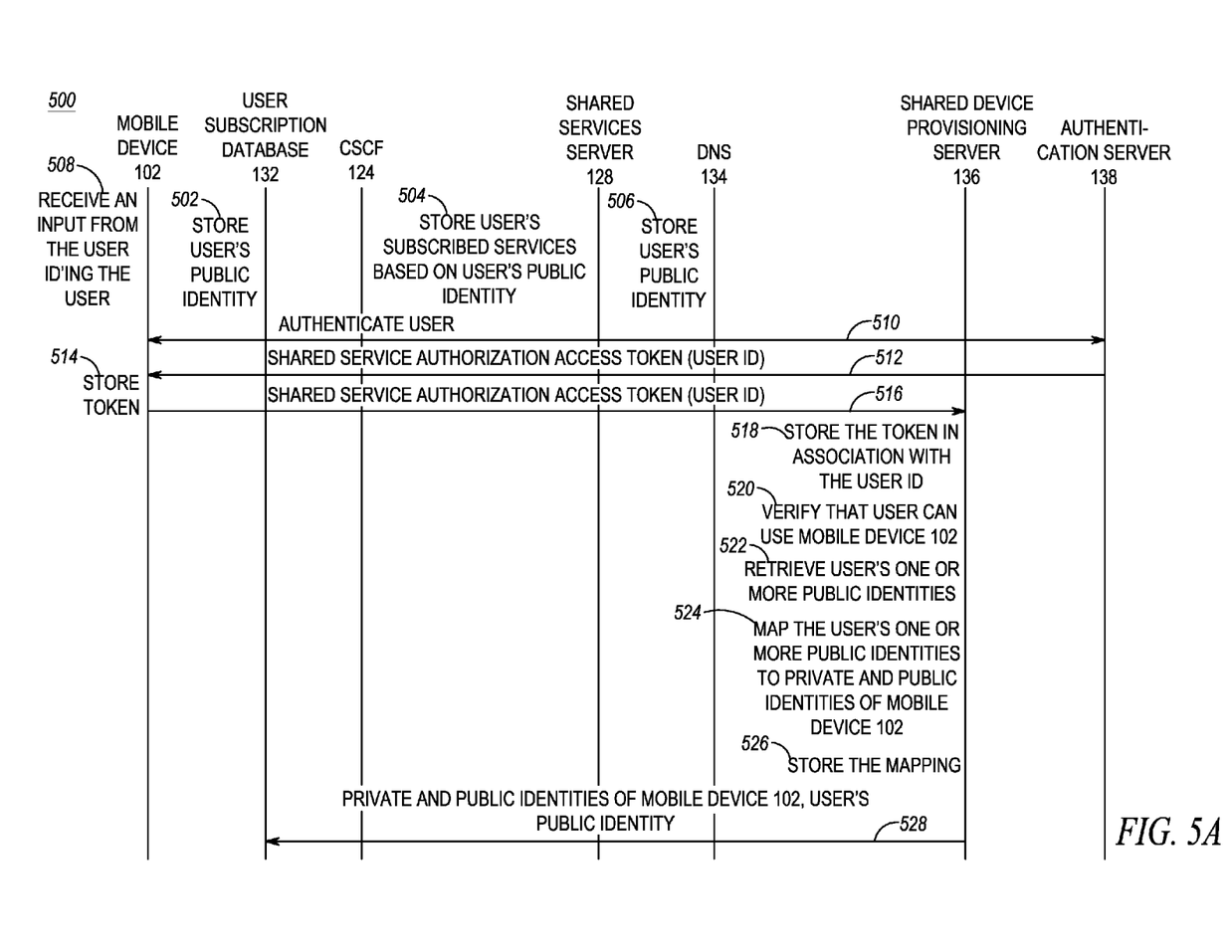
FIG. 5A is a signal flow diagram illustrating a method performed by the communication system of FIG. 1 in binding a user-based public identity, such as an IMS public identity, to a shared device in accordance with an embodiment of the present invention.
Figure 5B:
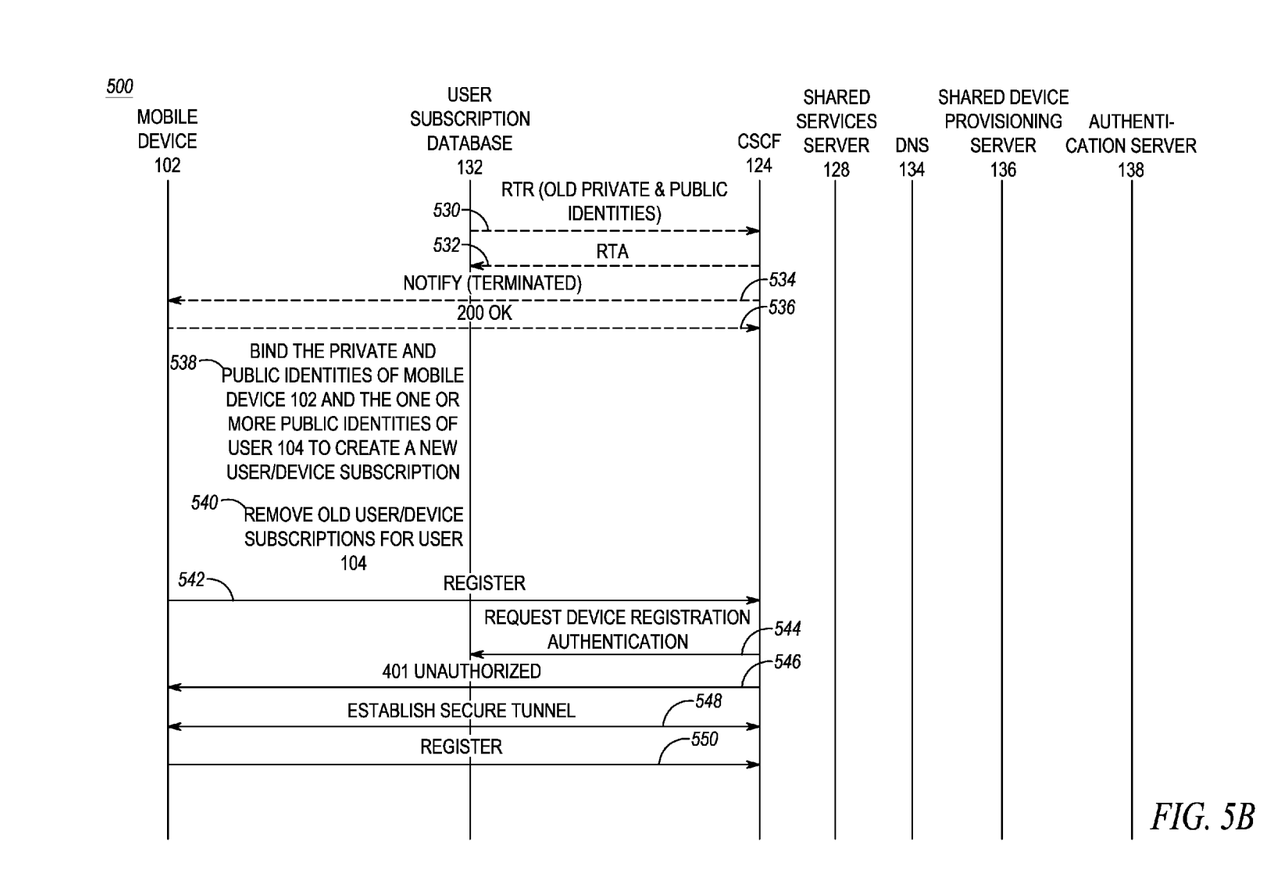
FIG. 5B is a continuation of the signal flow diagram of FIG. 5A illustrating a method performed by the communication system of FIG. 1 in binding a user-based public identity, such as an IMS public identity, to a shared device in accordance with an embodiment of the present invention.
Figure 5C:
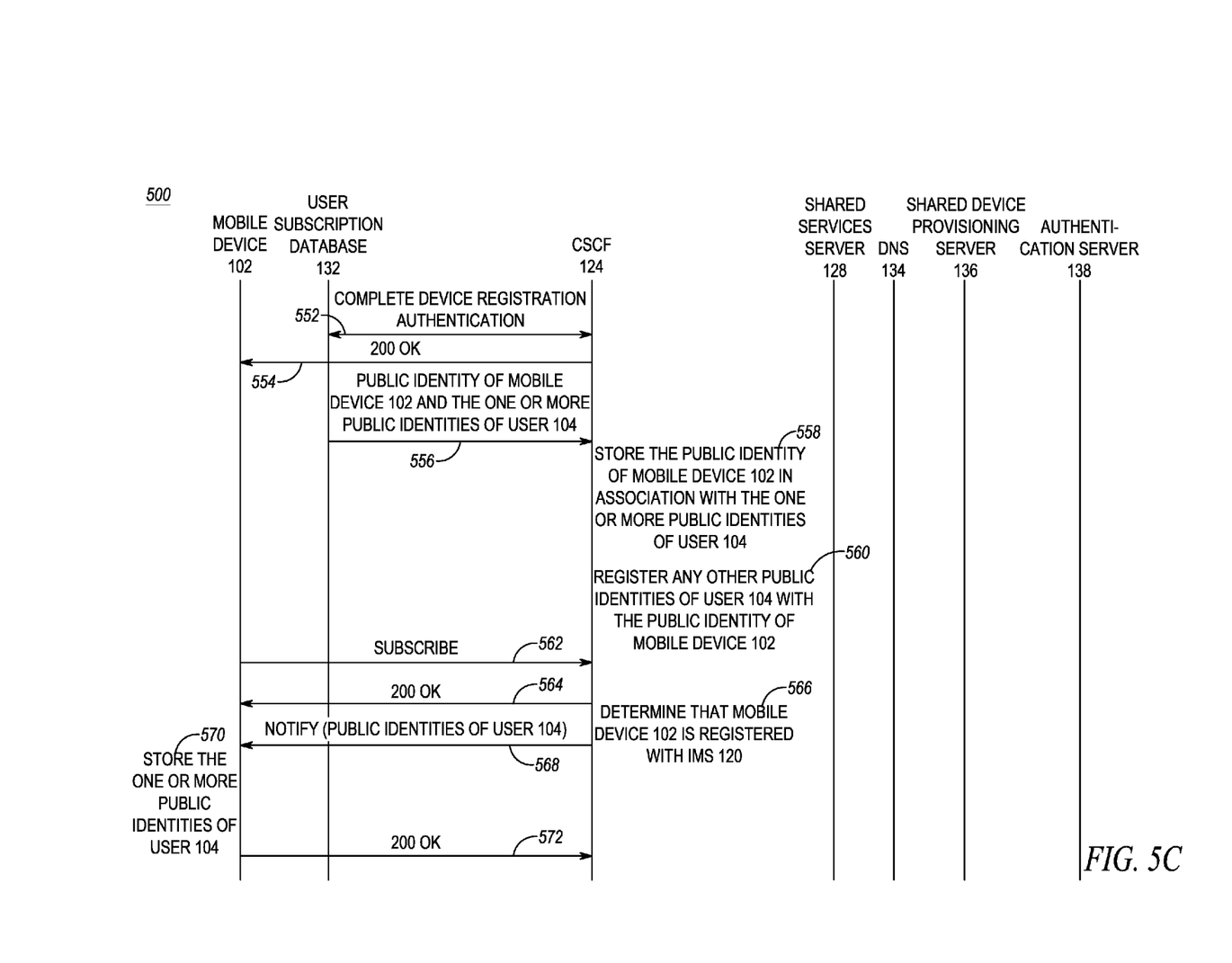
FIG. 5C is a continuation of the signal flow diagrams of FIGS. 5A and 5B illustrating a method performed by the communication system of FIG. 1 in binding a user-based public identity, such as an IMS public identity, to a shared device in accordance with an embodiment of the present invention.

Referring now to FIGS. 5A-5C, a signal flow diagram 500 is provided that illustrates a method performed by communication system 100 in binding a user-based public identity, such as an IMS public identity, to a shared device in accordance with some embodiments of the present invention. At the beginning of signal flow diagram 500, each of user subscription database 132 and DNS 134 maintains (502, 506) a public identity, such as an IP public identity (IMPU), of user 104. User 104 may be, for example and in a public safety context, a public safety officer, for example, a policeman, fireman, emergency medical technician (EMT), or paramedic. Further, shared services server 128 maintains (504) a subscription for user 104, which subscription includes services of service network 130 that are subscribed to by user 104, such as PTT services and telephony services, and further may include a role of, and privileges of (for example, a prioritization of user 104 relative to other subscribers), user 104. The subscription for user 104 is stored in shared services server 128 in association with the user's public identity, so that if the user's public identity is provided to the shared services server then the shared services server is able to retrieve the user's profile based on the public identity. User 104's public identity may be pre-provisioned by the operator of services network 130 into each of user subscription database 132 and DNS 134 and, similarly, the user's subscription may be pre-provisioned into shared services server 128.

Mobile device 102 initiates a normal session with infrastructure 140 utilizing the USIM credentials stored on the UICC included within the mobile device. The credentials are used by communication system 100, for example, an LTE system, to authorize access to infrastructure 140, to establish Internet Protocol (IP) sessions with the mobile device, and to establish default bearers to allow IP communication between the device and the infrastructure 140. The user of mobile device 102 is not known at this time, so a set of default services may be accessible by the user (for example, E911).

At some point in time, user 104 obtains mobile device 102 and inputs (508) an identifier of the user into the mobile device. The input may be, for example, a username, a password, a 2-factor authentication, a biometric input, a smart card input, or may utilize a near field communications device, and/or another unique identifier associated with the user. The input can also include one or more other factors associated with the user, for example, something that user knows, something that the user has, and/or something the user is. In some embodiments, receiving an input identifying a user of the mobile device forms part of a log-in of the user to the mobile device.

In response to receiving the user's input, mobile device 102 registers with services network 130, which connectivity was established when the mobile device initiated a normal session as described above. As part of the registration process, mobile device 102 authenticates (510) the user with authentication server 138 in accordance with well-known authentication techniques. For example, mobile device 102 may generate one or more authentication credentials based on the input received from the user, such as an identifier of user 104 (a 'user ID,' which may or may not be the same as the identifier input by the user into the mobile device) that uniquely identifies user 104 in communication system 100, and further retrieves an identifier of mobile device 102, such as an IMEI and/or an IMSI, and conveys the authentication credential(s) and mobile device identifier to authentication server 138. In response to receiving the authentication credentials, authentication server 138 authenticates user 104 and mobile device 102 and conveys (512), to mobile device 102, a message comprising a shared service authorization access token that authorizes the user logged into the mobile device to access one or more shared services of IMS 120, for example, a telephony access token that authorizes the user logged into the mobile device to access the services of an MINITEL, and which shared service authorization access token includes the user ID and may be in the form of an OAuth 2.0 token, a Security Assertion Markup Language (SAML) assertion, or other similar digital token that can be cryptographically verified by a relying party (in this case, permits the Shared Device Provisioning Server to verify that the mobile device/IMS client has been authenticated and is authorized for access to the services provided by the Shared Device Provisioning Server). In response to receiving the shared service authorization access token, mobile device 102 stores (514) the shared service authorization access token in at least one memory device 204, for example, in IMS client 208.

User 104 then requests that Shared Device Provisioning Server 136 allow the user to use mobile device 102. For example, mobile device 104 and Shared Device Provisioning Server 136 may mutually authenticate with each other by performing GBA (Generic Bootstrapping Architecture)/GAA (Generic Authentication Architecture) authentication, as described in 3GPP (Third Generation Partnership Project) Technical Specifications (TSs) 33.919, 33.220, 24.109, and 29.109, wherein the mobile device builds a security relation with the Shared Device Provisioning Server and the mobile device and Shared Device Provisioning Server agree on a session key to be used to encrypt data exchanged between the two. Mobile device 102 then securely conveys (516) the shared service authorization access token, including the user ID identifying user 104 in communication system 100, and a default public identity of mobile device 102, such as the IMEI or the IMSI of the mobile device, to Shared Device Provisioning Server 136 using the session key.

In response to receiving the shared service authorization access token from mobile device 102, Shared Device Provisioning Server 136 stores (518), in at least one memory device 404, the shared service authorization access token and user ID in association with the subscription information of user 104 and verifies (520) that user 104 is authorized to use mobile device 102. That is, Shared Device Provisioning Server 136 extracts the user ID from the received shared service authorization access token and determines, by reference to authorized user list 406 and shareable device list 410 and respectively based on the user ID and the default public identity of mobile device 102, that user 104 is authorized to use a shared device, such as mobile device 102, and that mobile device 102 is a shareable device that may be used by each of multiple users, such as user 104.

In response to verifying that user 104 is authorized to use mobile device 102, Shared Device Provisioning Server 136 obtains (522), from the subscription information 408 maintained for user 104, one or more public identities maintained for user 104, which one or more public identities may be used by mobile device 102 to obtain the services of IMS 120 on mobile device 102. Shared Device Provisioning Server 136 then maps (524) the private identify and public identify of mobile device 102 with the one or more public identities (for example, IMPUs) of user 104, that is, binds the private identity and public identity of mobile device 102 to the one or more public identities of user 104, and stores (526) the mapping, or binding, in at least one memory device 404. Consequently, the one or more public identities of user 104 may be used with the private identity and the public identity of mobile device 102.

Shared Device Provisioning Server 136 also instructs (528) user subscription database 132 to update (528) the subscription information of user 104. That is, Shared Device Provisioning Server 136 conveys the private identity (for example, an IMPI) and public identity (for example, an IMPU) of mobile device 102 and the one or more public identities of user 104 to user subscription database 132. Shared Device Provisioning Server 136 further instructs user subscription database 132 that the public identity of the mobile device is barred from performing any procedures other than IMS registration procedures and instructs the user subscription database to de-register mobile device 102 in IMS 120.

User subscription database 132 then de-registers mobile device 102 in IMS 120, thereby clearing a registration state of mobile device 102 in IMS 120. More particularly, user subscription database 132 instructs (530) CSCF 124 to update mobile device subscription information maintained for mobile device 102 by the CSCF, and more particularly to de-register, that is, to unbind, any old private and public identities (for example, an IMPI and an IMPU) of mobile device 102 from an identifier of the mobile device. For example, user subscription database 132 may convey a SIP (Session Initiation Protocol) RTR (Registration-Termination-Request) message to the CSCF that includes the public identities associated with mobile device 102. In response to receiving the deregistration instruction, if mobile device 102 is currently registered with IMS 120, CSCF 124 de-registers the mobile device by deleting, from the mobile device subscription information maintained for mobile device 102 by the CSCF, any private and public identities associated with mobile device 102, that is, unbinding such private and public identities from an identifier, such as an IMEI or an IMSI, of the mobile device. CSCF 124 then notifies (532) user subscription database 132 that mobile device 102 has been deregistered, for example, by conveying a SIP RTA (Registration-Termination-Answer) message to the user subscription database. Additionally, if mobile device 102 was registered with IMS 120 and has just been deregistered, CSCF 124 notifies (534) mobile device 102 of the deregistration of the old private and public identities, for example, by conveying a SIP NOTIFY (TERMINATED) message to the mobile device, which message may be acknowledged (536) by the mobile device, for example, by conveying a SIP 200 OK message back to the CSCF.

Further, in response to receiving the private identity and public identity of mobile device 102 and the one or more public identities of user 104, user subscription database 132 binds together the private identity and the public identity of mobile device 102 and the one or more public identities of user 104 to create (538) a new user/device subscription for user 104, wherein the private identity and public identity of mobile device 102 are bound to, that is, are associated with, the one or more public identities of user 104, and stores the new user/device subscription. That is, Shared Device Provisioning Server 136 updates the user subscription database 132 to store the new user/device subscription for user 104 and optionally may remove (540) any old user/device subscriptions for user 104 (for example, user/device subscriptions associated with user 104 and a mobile device other than mobile device 102 and user/device subscriptions associated with mobile device 102 and a user other than user 104) from the user subscription database 132. That is, Shared Device Provisioning Server 136 updates the subscription of user 104 to include the private identity and public identity of mobile device 102 and the one or more public identities of user 104 stored in the user subscription database 132, and optionally deletes from the user subscription database any binding, or coupling, of the one or more public identities of user 104 to any mobile device identities other than those of mobile device 102, and deletes from the user subscription database any binding, or coupling, of the identities of mobile device 102 to any public identities other than those of user 104. Shared Device Provisioning Server 136 may delete other mobile device bindings if communication system 100 permits the user to only have one active device at a time, as a communication system that does not wish to enforce such a limit may allow the user to have more than one active binding established at any given time.

In response to being notified by CSCF 124 of the deregistration, mobile device 102 re-registers with IMS 120, and in particular with CSCF 124, and the IMS 120 accepts a registration of mobile device 102 using the private identity and public identity of the mobile device 102, in accordance with known IMS registration techniques. That is, mobile device 102 conveys (542), to IMS 120 and in particular to CSCF 124, a first registration message, for example, a SIP REGISTER message, that includes the mobile device's contact information, that is, the private identity and public identity of mobile device 102. In response to receiving the request, CSCF 124 sends (544) an authentication request to user subscription database 132, which authentication request includes the private identity and public identity of mobile device 102. When Authentication and Key Agreement (AKA) authentication is used, the user subscription database 132 uses the private identity of mobile device 102 to calculate an authentication vector comprising five authentication parameters, that is, the quintuple <RAND, AUTN, CK, IK> and returns the authentication vector to the CSCF 124, indicating that the user subscription database is requesting that the mobile device use its security algorithms in order to authenticate. CSCF 124 then sends (546) authentication parameters to mobile device 102, for example, a SIP 401 UNAUTHORIZED message that includes two of the authentication parameters, that is, RAND and AUTN. CSCF 124 also establishes (548) a secure tunnel, that is, an IPSec (Internet Protocol Security) tunnel, with mobile device 102.

As mobile device 102 has a same secret key as user subscription database 132, the mobile device can calculate the AUTN, If this matches the AUTN received from CSCF 124, mobile device 102 considers CSCF 124/IMS 120 to be legitimate. Mobile device 102 also calculates a response value, RES, which the mobile device then sends (550) to CSCF 124 in a second registration message, for example, another SIP REGISTER message, and includes in the message the private identity and public identity of mobile device 102 and the RES. When CSCF 124 receives the second registration message, the CSCF forwards (552) the second registration message with the RES to user subscription database 134. If the RES parameter sent by mobile device 102 is equal to the XRES parameter calculated the user subscription database during the first registration attempt, then the user subscription database authenticates (552) mobile device 102 and so informs (552) CSCF 124. CSCF 124 then informs (554) mobile device 102 that the mobile device is authenticated and registered with IMS 120, for example, by conveying a SIP 200 OK message to the mobile device 102.

Further, in response to authenticating mobile device 102, user subscription database 132 conveys (556) the one or more public identities of user 104 and the public identity of mobile device 102 to CSCF 124. CSCF 124 then updates the mobile device subscription information maintained by the CSCF for mobile device 102, that is, stores (558) the one or more public identities of user 104 in association with, that is, binds the one or more public identities of user 104 to the public identity of mobile device 102. As user 104 may have multiple public identities, such as a SIP URI and a TEL URI, updating the mobile device subscription information maintained by the CSCF for mobile device 102 further includes registering (560) any other public identities of the user with the public identity of mobile device 102, that is, mapping such other public identities of the user to the public identity of mobile device 102, by performing an implicit registration as known in the art.

In response to the authentication and registration of mobile device 102 with IMS 120 and the updating of the mobile device 102's subscription information with public identities of user 104, communication system 100 provisions the mobile device with the public identities of user 104. More particularly, in response to being informed of the authentication and registration with IMS 120, mobile device 102 requests (562) IMS registration information from CSCF 124, for example, by conveying a SIP SUBSCRIBE message to the CSCF. In response to receiving the subscription message, CSCF 124 may acknowledge (564) the message, for example, by conveying a SIP 200 OK message to mobile device 102, and confirms (566) that mobile device 102 is registered with IMS 120. CSCF 124 then retrieves the one or more public identities of user 104 (for example, the SIP URI and the TEL URI) that are maintained by the CSCF in association with mobile device 102, that is, that are mapped to the public identity of the mobile device, and conveys (568) the retrieved one or more public identities of user 104 to mobile device 102, for example, by conveying a SIP NOTIFY message to the mobile device that includes the public identities. Mobile device 102 then stores (570) the received public identities of user 104 in the at least one memory device 204 of the mobile device, and preferably in IMS client 208, and acknowledges (572) receipt of the public identities of user 104, for example, by conveying a SIP 200 OK message back to the CSCF 124, and signal flow diagram 500 then ends.

In some embodiments of the present invention, subsequent to the binding of the private identity and public identity of mobile device 102 to the one or more public identities of user 104 at user subscription database 132 and CSCF 124, communication system 100 may automatically trigger a deregistration of mobile device 102 at the user subscription database and CSCF and an unbinding of the identities in response to an expiration of mobile device 102's access to a shared service. For example, the shared service authorization access token may be a limited lifetime access token, that is, may be valid for only a limited, predetermined period of time, and correspondingly, mobile device 102 may be able to access an associated shared service only for a limited period of time, that is, only during the lifetime of the shared service authorization access token. Upon expiration of the shared service authorization access token, Shared Device Provisioning Server 136 may automatically initiate a deregistration of mobile device 102, that is, automatically unbind the private identity and public identity of mobile device 102 that were bound to the one or more public identities of user 104 and notify user subscription database 132 of the deregistration, in response to which the user subscription database 132 creates a new subscription for user 104 that does not include any association with mobile device 102. Further, user subscription database 132 may notify CSCF 124 of the unbinding of the private identity and public identity of mobile device 102 with the one or more public identities of user 104, and in response CSCF 124 may automatically deregister mobile device 102 by deleting the private and public identities maintained in the mobile subscription information for mobile device 102.

Further, in some embodiments of the present invention wherein the shared service authorization access token is a limited lifetime access token, in response to detecting that the lifetime of the shared service authorization access token is nearing expiration, mobile device 102 may obtain a new shared service authorization access token or Shared Device Provisioning Server 136 may convey a notification to mobile device 102 notifying the mobile device of the impending expiration and/or a need to obtain a new shared service authorization access token. In response, the Shared Device Provisioning Server 136 may receive, from mobile device 102, a a re-authorization of the binding of the public identity of the mobile device and the private identity of the mobile device to the public identity of the user. That is, in response to obtaining a new shared service authorization access token, mobile device 102 may use the token to re-authorize the binding of the private identity and public identity of the mobile device to the one or more public identities of user 104 with the Shared Device Provisioning Server 136 as described above.

Figure 6A:
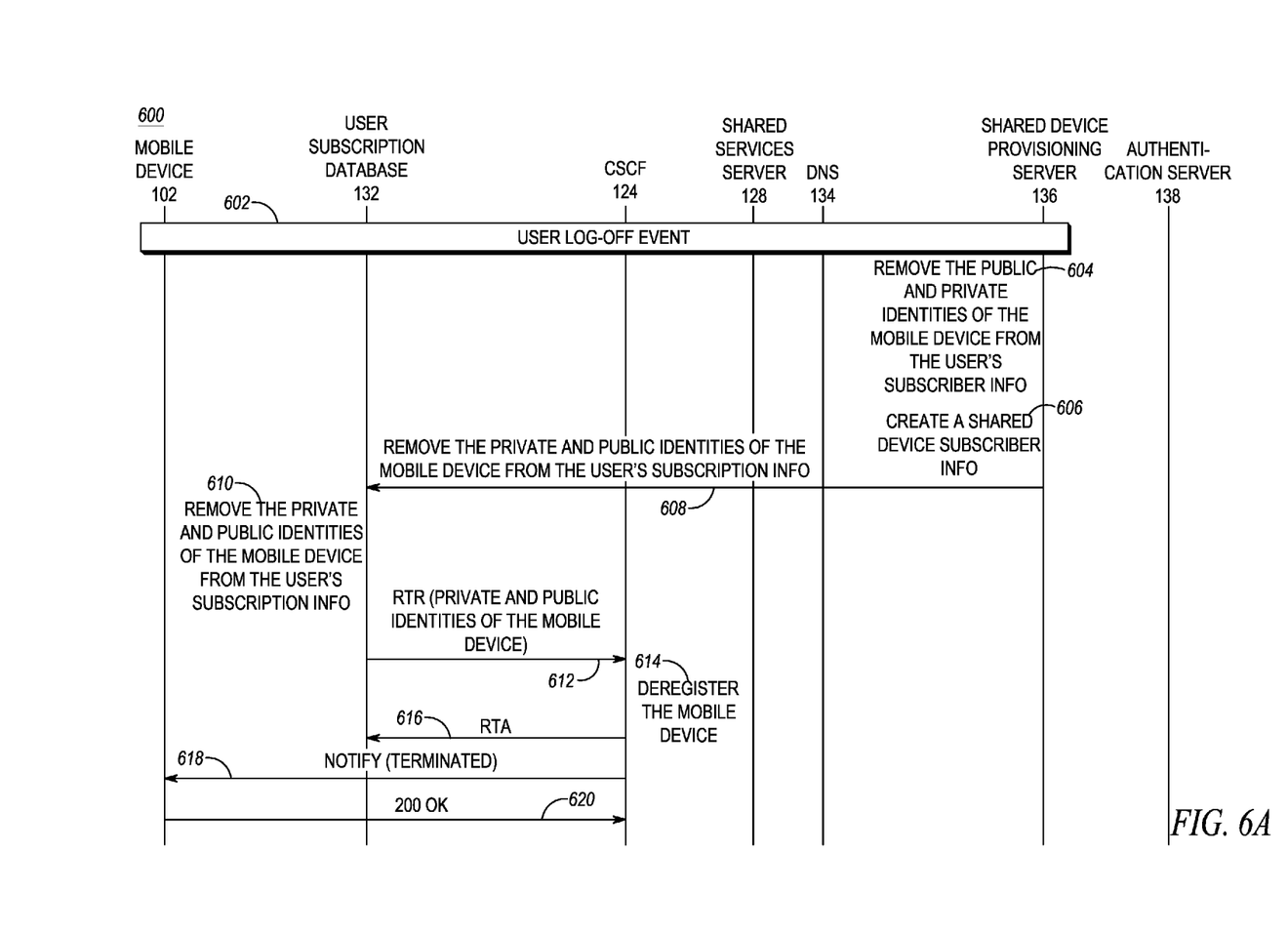
FIG. 6A is a signal flow diagram illustrating a method performed by the communication system of FIG. 1 in unbinding a user-based public identity, such as an IMS public identity, from a shared device in accordance with some embodiments of the present invention.
Figure 6B:
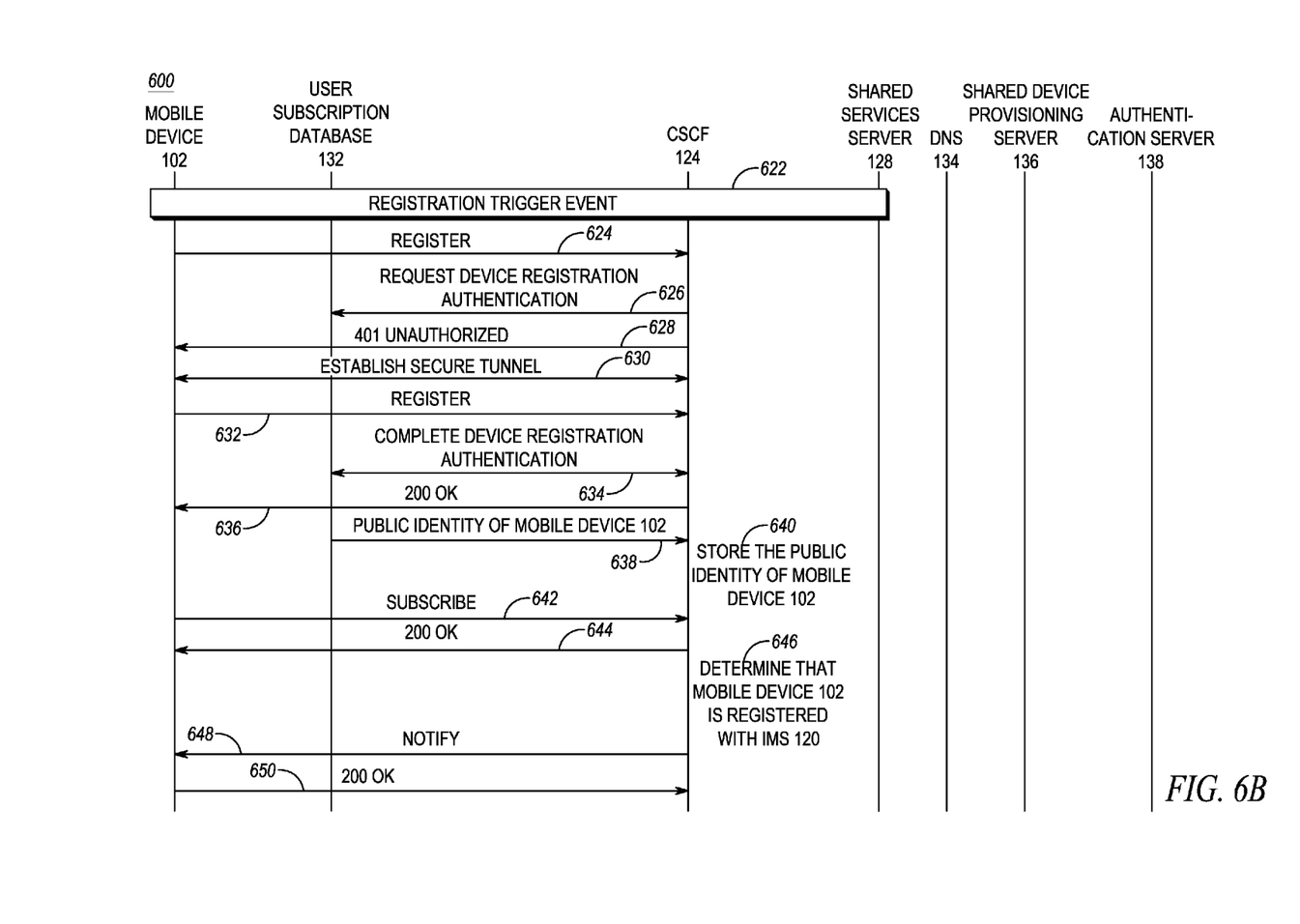
FIG. 6B is a continuation of the signal flow diagram of FIG. 6A illustrating a method performed by the communication system of FIG. 1 in unbinding a user-based public identity, such as an IMS public identity, from a shared device in accordance with some embodiments of the present invention.

Referring now to FIGS. 6A and 6B, a signal flow diagram 600 is provided that illustrates a method performed by communication system 100 in unbinding a user-based public identity, such as an IMPU, from a shared device in accordance with some embodiments of the present invention. Signal flow diagram 600 begins when Shared Device Provisioning Server 136 determines (602) that a user log-off event has occurred at mobile device 102. For example, user 104 may log off of mobile device 102, or the shared service authorization access token may be a limited lifetime token that is valid only for a limited, predetermined period of time, in which case the log off event may be an expiration of the shared service authorization access token. If the log off event is user 104 logging off of mobile device 102, then the mobile device notifies Shared Device Provisioning Server 136 that the user has logged off. On the other hand, if the log off event is the expiration of the shared service authorization access token, then Shared Device Provisioning Server 136 may be self-aware of the log off event as the Shared Device Provisioning Server maintains a copy of the shared service authorization access token.

In response to determining that a user log-off event has occurred, Shared Device Provisioning Server 136 disassociates (604), or unbinds, user 104's one or more public identities (for example, IMPUs) from the private identity and public identity of mobile device 102 in the subscription information of user 104, so that the user's public identities are no longer associated with mobile device 102. From another perspective, by unbinding the user's public identities from mobile device 102, the user's public identities no longer serve as public identities for mobile device 102.

Further Shared Device Provisioning Server 136 reconfigures (606) mobile device 102 as its own subscriber, that is, creates a subscription for mobile device 102 that does not include an association with any particular user. That is, Shared Device Provisioning Server 136 creates, and stores in at least one memory device 404, a new set of subscriber information for mobile device 102, which new set of subscriber information does not include the public identity of any particular user. Further, Shared Device Provisioning Server 136 no longer bars mobile device 102 from performing non-registration IMS procedures.

Shared Device Provisioning Server 136 also initiates an IMS deregistration of mobile device 102. That is, Shared Device Provisioning Server 136 instructs (608) user subscription database 132 to delete the association between user 104 and mobile device 102, that is, to delete, from the subscription information maintained for user 104 in the user subscription database, any association between the user's one or more public identities and the private identity and public identity of mobile device 102. In response to receiving the instruction from Shared Device Provisioning Server 136, user subscription database 132 removes (610) the association between user 104 and mobile device 102 in the subscription information of user 104, that is, deletes the association between the user's one or more public identities and the private identity and public identity of mobile device 102.

User subscription database 132 further de-registers mobile device 102 in IMS 120, thereby clearing a registration state of mobile device 102 in IMS 120, More particularly, user subscription database 132 instructs (612) CSCF 124 to de-register the currently registered public identities associated with mobile device 102, for example, by conveying a SIP (Session Initiation Protocol) RTR (Registration-Termination-Request) message to the CSCF that includes the public identity associated with mobile device 102. In response to receiving the deregistration request, CSCF 124 de-registers (614) the mobile device by unbinding the public identity of mobile device 102 from the one or more public identities of user 104, for example, by deleting, from the mobile device subscription information maintained for mobile device 102, the public identities associated with the mobile device (that is, the one or more public identities of user 104 and the public identity of mobile device 102). CSCF 124 then notifies (616) user subscription database 132 that mobile device 102 has been deregistered, for example, by conveying a SIP RTA (Registration-Termination-Answer) message to the user subscription database. Additionally, CSCF 124 notifies (618) mobile device 102 of the de-registration of the mobile device, that is, of the public identities associated with the mobile device, for example, by conveying a SIP NOTIFY (TERMINATED) message to the mobile device, which message may be acknowledged (620) by the mobile device, for example, by conveying a SIP 200 OK message back to the CSCF.

Subsequent to mobile device 102 deregistering with IMS 120, the mobile device may re-register with IMS 120 without associating with any particular user. For example, a registration event may occur (622), such as an administrative de-registration of mobile device 102 or the mobile device re-activating in communication system 100, for example, leaving an 'airplane mode' and resuming full communications, which registration event triggers a registration by mobile device 102 with IMS network 120.

In re-registering with IMS 120, mobile device 102 registers only its own public identity with IMS 120, as opposed to registering the public identities of both the mobile device and user 104. That is, mobile device 102 conveys (624), to IMS 120 and in particular to CSCF 124, a registration message, for example, a SIP REGISTER message, that includes the mobile device's contact information, that is, the private identity and public identity of mobile device 102. In response to receiving the request, CSCF 124 sends (626) an authentication request to user subscription database 132, which authentication request includes the private identity and public identity of mobile device 102. When Authentication and Key Agreement (AKA) authentication is used, the user subscription database 132 uses the private identity of mobile device 102 to calculate an authentication vector comprising five authentication parameters, that is, the quintuple <RAND, AUTN, XRES, CK, IK> and returns the authentication vector to the CSCF 124, indicating that the user subscription database is requesting that the mobile device use its security algorithms in order to authenticate. CSCF 124 then sends (628) authentication parameters to mobile device 102, for example, a SIP 401 UNAUTHORIZED message that includes two of the authentication parameters that is, RAND and AUTN. CSCF 124 also establishes (630) a secure tunnel, that is, an IPSec (Internet Protocol Security) tunnel, with mobile device 102.

As mobile device 102 has a same secret key as user subscription database 132, the mobile device can calculate the AUTN. If this matches the AUTN received from CSCF 124, mobile device 102 considers CSCF 124/IMS 120 to be legitimate. Mobile device 102 also calculates a response value, RES, which the mobile device then sends (632) to CSCF 124 in another registration message, for example, another SIP REGISTER message, and includes in the message the private identity and public identity of mobile device 102 and the RES. When CSCF 124 receives the second registration message, the CSCF forwards (634) the second registration message with the RES to user subscription database 134. If the RES parameter sent by mobile device 102 is equal to the XRES parameter calculated the user subscription database during the first registration attempt, then the user subscription database authenticates (634) mobile device 102 and so informs (634) CSCF 124. CSCF 124 then informs (636) mobile device 102 that the mobile device is authenticated and registered with IMS 120, for example, by conveying a SIP 200 OK message to the mobile device 102. Further, in response to authenticating mobile device 102, user subscription database 132 conveys (638) the public identity of mobile device 102 to CSCF 124. CSCF 124 then updates the mobile device subscription information maintained by the CSCF for mobile device 102, that is, stores (640) the public identity of mobile device 102.

In response to being informed of the authentication and registration with IMS 120, mobile device 102 requests (642) IMS registration information from CSCF 124, for example, by conveying a SIP SUBSCRIBE message to the CSCF. In response to receiving the subscription message, CSCF 124 may acknowledge (644) the message, for example, by conveying a SIP 200 OK message to mobile device 102, and confirms (646) that mobile device 102 is registered with IMS 120. CSCF 124 then retrieves the public identity of the mobile device and conveys (648) a SIP NOTIFY message to the mobile device that includes the public identity of the mobile device. Mobile device 102 then acknowledges (650) receipt of SIP NOTIFY message, for example, by conveying a SIP 200 OK message back to the CSCF 124, and signal flow diagram 600 then ends.

Further, in some embodiments, a logoff event may occur when mobile device 102, while remaining in an active state, suspends some or all wireless transmission functionality, for example, switches to an airplane mode. In the event of such a suspension of wireless transmission functionality, mobile device 102 may deregister from a service of IMS 120 but the IMS may not delete the binding of the public identity of the mobile device and the public identity of the user. When mobile device 102 lifts the suspension, that is, resumes full wireless transmission functionality, the mobile device may convey, to IMS 120 and in particular CSCF 124, a request to re-register with the IMS. In the event of receiving such a request to re-register, IMS 120, and in particular CSCF 124, may register the private identity of the mobile device and the public identity of the mobile device, while not further registering the public identity of the user.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the expressions "air interface" and "wireless link" are intended to be used interchangeably herein.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for binding a user's Internet Protocol Multimedia Subsystem (IMS) public identity to a mobile device that is shared among a plurality of users, the method comprising:
    receiving, by an infrastructure element from a mobile device, a message comprising a shared service authorization access token that is associated with a shared service, wherein the shared service authorization access token comprises an identifier of a user of the mobile device and wherein the message further comprises a default public identity of the mobile device;
    based on the identifier of the user and the default public identity of the mobile device, determining that the user is authorized to use the mobile device for the shared service;
    in response to determining that the user is authorized to use the mobile device for the shared service, obtaining a public identity of the user;
    mapping the public identity of the user to the mobile device to bind a private identity and a public identity of the mobile device and public identity of the user;
    instructing a user subscription database to update the user's service subscription information; and
    registering the mobile device with an IMS using the public identity of the mobile device and the public identity of the user.

2. The method of claim 1, further comprising updating the user's service subscription information by binding a public identity of the mobile device and the private identity of the mobile device to the public identity of the user.

3. The method of claim 1, further comprising:
    in response to updating the user's service subscription information in the user subscription database, conveying the public identity of the user to the mobile device.

4. The method of claim 1, wherein updating comprises creating a new subscription for the user and the mobile device in the user subscription database and wherein the method further comprises:
   deregistering an old subscription for the mobile device in the user subscription database.

5. The method of claim 1, wherein the public identity of the user comprises a plurality of public identities of the user.

6. The method of claim 1, further comprising:
   in response to updating the user's subscription information in the user subscription database, receiving a subscription from the mobile device, using the public identity of the mobile device, to a shared device service.

7. The method of claim 1, wherein the shared device service is a service provided by an application built into the HSS.

8. The method of claim 1, wherein the shared device service is a service provided by an application server external to IMS and HSS.

9. The method of claim 1, wherein the shared service is an IMS Application Service.

10. The method of claim 1, wherein registering comprises:
   deregistering the mobile device with the MS; and
   subsequent to deregistering the mobile device, registering the mobile device with the IMS using the public identity of the mobile device.

11. The method of claim 1, further comprising:
   in response to registering the mobile device with the IMS, informing the mobile device that the mobile device is registered with the IMS.

12. The method of claim 1, further comprising:
   automatically triggering a deregistration of the mobile device upon expiration of a predetermined period of time, wherein deregistration comprises an unbinding of the public identity of the mobile device and the private identity of the mobile device from the public identity of the user.

13. The method of claim 1, wherein access to the shared service is only for a limited period of time and wherein the method further comprises:
   notifying the mobile device of an impending expiration of access to the shared service; and
   in response to notifying the mobile device of the impending expiration, receiving, from the mobile device, a re-authorization of the binding of the public identity of the mobile device and the private identity of the mobile device to the public identity of the user.

14. The method of claim 1, wherein the shared device service is an IMS service provided by the IMS and wherein the method further comprises:
   automatically triggering a deregistration of the mobile device in response to one or more of a powering down of the mobile device and a deregistration of the mobile device from the IMS system.

15. A method for unbinding a user's Internet Protocol Multimedia Subsystem (IMS) public identity from a mobile device that is shared among a plurality of users, the method comprising:
   determining, by an infrastructure device, that a log off event has occurred at the mobile device, wherein a public identity of a user is associated with a mobile device identifier of the mobile device;
   in response to determining that the log off event has occurred:
      updating the user's subscription information in the user subscription database, wherein updating comprises unbinding the public identity of the mobile device and the private identity of the mobile device from the public identifier of the user;
      instructing the mobile device to remove the public identity of the user from the mobile device by notifying the mobile device of a deregistration of the public identity and the private identity of the mobile device and the public identity of the user; and
      clearing a registration state of the mobile device with an IMS using the public identity of the mobile device and the public identity of the user;
   receiving, from the mobile device, a request to re-register with the IMS; and
   in response to receiving the request, registering the private identity of the mobile device and the public identity of the mobile device, while not further registering the public identity of the user.

16. An apparatus that is capable of binding a user's Internet Protocol Multimedia Subsystem (IMS) public identity to a mobile device that is shared among a plurality of users, the apparatus comprising:
   a shared device provisioning server comprising:
      user subscription database;
      a processor; and
      an at least one memory device that is configured to store a set of instructions that, when executed by the processor, cause the processor to perform the following functions:
         receive, from a mobile device, a message comprising a shared service authorization access token that is associated with a shared service, wherein the shared service authorization access token comprises an identifier of a user of the mobile device and wherein the message further comprises a default public identity of the mobile device;
         based on the identifier of the user and the default public identity of the mobile device, determine that the user is authorized to use the mobile device for the shared service;
         in response to determining that the user is authorized to use the mobile device for the shared service, obtain a public identity of the user;
         map the public identity of the user to the mobile device to bind a private identity and a public identity of the mobile device and public identity of the user;
         instruct the user subscription database to update the user's service subscription information by binding the private identity and the public identity of the mobile device to the public identity of the user; and
         register the mobile device with an IMS using the public identity of the mobile device and the public identity of the user.

17. The apparatus of claim 16, wherein the user subscription database is configured to update the user's service subscription information by creating a new subscription for the user and the mobile device and wherein the user subscription database further is configured to:
   deregister an old subscription for the mobile device in the user subscription database.

18. The apparatus of claim 16, wherein the shared device provisioning server is configured to:
   automatically initiate a deregistration of the mobile device upon expiration of a predetermined period of time.

19. The apparatus of claim 16, wherein the user subscription database is configured to provide the shared service.

20. The apparatus of claim 16, further comprising an application server that is configured to receive a subscription from the mobile device, using the public identity of the mobile device, to a shared service.

21. The apparatus of claim 20, wherein the application server is external to the IMS and the user subscription database.

22. The apparatus of claim 16, wherein the shared service is an IMS Application Service.

23. The apparatus of claim 16, further comprising an IMS element that is configured to:
   register the mobile device using the public identity and the private identity of the mobile device and the public identity of the user; and
   convey the public identity of the user to the mobile device.

24. The apparatus of claim 23, wherein the IMS element is configured to register the mobile device by:
   deregistering the mobile device with the IMS; and
   subsequent to deregistering the mobile device, register the mobile device using the public identity and the private identity of the mobile device.

25. The apparatus of claim 23, wherein the IMS element that is configured to:
   in response to registering the mobile device with the IMS, inform the mobile device that the mobile device is registered with the IMS.

26. The apparatus of claim 16, wherein access to the shared service is only for a limited period of time and wherein the shared device provisioning server is configured to:
   notify the mobile device of an impending expiration of access to the shared service; and
   in response to notifying the mobile device of the impending expiration, receive, from the mobile device, a re-authorization of the binding of the public identity of the mobile device and the private identity of the mobile device to the public identity of the user.

27. The apparatus of claim 16, further comprising the mobile device, wherein access to the shared service is only for a limited period of time and wherein the mobile device is configured to:
   detect when the period of time for access to the shared service is nearing expiration; and
   in response to detecting that the period of time is nearing expiration, re-authorize the binding of the private identity and the public identity of the mobile device to the public identity of the user with the shared device provisioning server.

28. The apparatus of claim 16, wherein the shared service is an IMS service provided by an IMS and wherein the shared device provisioning server is configured to:
   automatically trigger a deregistration of the mobile device in response to powering down of the mobile device.

* * * * *